US008985194B2

(12) United States Patent
Lin (10) Patent No.: US 8,985,194 B2
(45) Date of Patent: Mar. 24, 2015

(54) RADIATING FIN, THERMAL MODULE FORMED WITH THE SAME, AND METHOD OF MANUFACTURING THE SAME

(75) Inventor: Sheng-Huang Lin, Sinjhuang (TW)

(73) Assignee: Asia Vital Components Co., Ltd., New Taipei (TW)

( * ) Notice: Subject to any disclaimer, the term of this patent is extended or adjusted under 35 U.S.C. 154(b) by 1157 days.

(21) Appl. No.: 12/879,013

(22) Filed: Sep. 10, 2010

(65) Prior Publication Data
US 2012/0031589 A1 Feb. 9, 2012

(30) Foreign Application Priority Data
Aug. 5, 2010 (TW) .............................. 99126084 A (51) Int. Cl.
F28F 7/00 (2006.01)
B23P 15/26 (2006.01)
F28D 15/02 (2006.01)
F28F 1/32 (2006.01)

(52) U.S. Cl.
CPC ................. B23P 15/26 (2013.01); F28D 15/02 (2013.01); F28F 1/32 (2013.01)
USPC ..... 165/80.2; 165/181; 165/80.3; 29/890.046

(58) Field of Classification Search
USPC .................. 165/80.2, 80.3, 181; 29/890.046, 29/890.038, 890.032
See application file for complete search history.

(56) References Cited

U.S. PATENT DOCUMENTS

| 1,812,509 | A | * | 6/1931 | Benson | 165/151 |
| 2,089,340 | A | * | 8/1937 | Cobb | 165/182 |
| 2,475,504 | A | * | 7/1949 | Jackson | 475/179 |
| 2,656,808 | A | * | 10/1953 | Plumeri et al. | 72/326 |
| 2,737,370 | A | * | 3/1956 | Frisch et al. | 165/134.1 |
| 3,847,213 | A | * | 11/1974 | Stich | 165/181 |
| 5,042,576 | A | * | 8/1991 | Broadbent | 165/151 |
| 5,582,246 | A | * | 12/1996 | Dinh | 165/181 |
| 5,960,866 | A | * | 10/1999 | Kimura et al. | 165/104.33 |
| 2003/0094273 | A1 | * | 5/2003 | Toth et al. | 165/183 |
| 2003/0094274 | A1 | * | 5/2003 | Toth et al. | 165/183 |
| 2009/0151913 | A9 | * | 6/2009 | Lakhdhar et al. | 165/151 |
| 2011/0162206 | A1 | * | 7/2011 | Chen | 29/890.046 |
| 2011/0290449 | A1 | * | 12/2011 | Huang | 165/104.26 |

* cited by examiner

Primary Examiner — Frantz Jules
Assistant Examiner — Erik Mendoza-Wilkenfe (57) ABSTRACT

A radiating fin and a method of manufacturing the same are disclosed. The radiating fin includes a main body having a first side and an opposite second side, and being provided with at least one through hole to extend between the first and the second side for a heat pipe to extend therethrough; and at least one extension being formed on at least one of the first and the second side of the main body to locate around the at least one through hole and axially project from the main body. The extension is crimped to form a plurality of circumferentially alternate ridge portions and valley portions for tightly pressing against an outer surface of the heat pipe, so as to firmly bind the radiating fin to the heat pipe. A thermal module can be formed by sequentially binding a plurality of the radiating fins to the heat pipe.

10 Claims, 10 Drawing Sheets

RADIATING FIN, THERMAL MODULE FORMED WITH THE SAME, AND METHOD OF MANUFACTURING THE SAME

This application claims the priority benefit of Taiwan patent application number 099126084 filed on Aug. 5, 2010.

FIELD OF THE INVENTION

The present invention relates to a radiating fin, a thermal module formed with the same and a method of manufacturing the same; and more particularly, to a structure and a method of binding radiating fins to heat pipes.

BACKGROUND OF THE INVENTION

Cooling or heat removing is always an impediment in the constant development in various electronic industrial fields. To meet users' demands for highly efficient, highly integrated and multifunctional electronic devices, electronic manufacturers have to take up the big challenge in heat dissipation. Therefore, it has become a major task in the electronic industry to research and develop means enabling high efficient heat transfer and dissipation.

A heat sink is normally used for dissipating heat produced by electronic elements or systems into ambient air. A heat sink with lower thermal resistance would have higher heat dissipation efficiency. Generally speaking, thermal resistance includes two parts, namely, the spreading resistance inside the heat sink and the thermal resistance of convection between the surface of the heat sink and the ambient air. In implementation, materials with high thermal conductivity, such as copper and aluminum, are often used to manufacture the heat sink, so as to reduce the thermal resistance thereof. However, the thermal resistance of convection would limit the performance of the heat sink, preventing the same from meeting the heat dissipation efficiency required by the new generation of electronic elements.

Currently, heat dissipating mechanisms with better efficiency are continuously introduced into the market, such as the thermal module combining heat sink and heat pipe having high heat conducting performance, in order to effectively solve the current problem of heat dissipation.

Presently, there are several different ways available for associating the heat pipe with the heat sink. One of these ways is connecting the heat pipe to through holes formed on the heat sink by way of tight fitting. However, in this connecting way, the heat pipe and the heat sink are subject to scratch or deformation when the heat pipe is forced through the through holes. In some worse conditions, the through holes would even become broken. Therefore, the good yield of thermal module manufactured in this connecting way is relatively low.

Another way is to connect the heat pipe to the through holes formed on the heat sink by way of loose fitting, and apply thermal paste or tin solder in the clearance between the heat pipe and the heat sink. To use this connecting way, grooves communicating with the through holes must be formed on the heat sink, and the thermal paste or tin solder is applied in the grooves. More particularly, the heat pipe is first extended through the through holes, and then the thermal paste or tin solder is heated to melt into liquid, and allow the molten thermal paste or tin solder to cool and set between the heat pipe and the heat sink. The second way of associating the heat pipe with the heat sink has low manufacturing efficiency because a large number of processing steps is involved to increase the total processing time needed to complete the finished product, and surplus thermal paste or tin solder tends to drip on the heat sink to cause poor appearance and increased thermal impedance of the heat sink.

It is therefore tried by the inventor to overcome the above problems by developing an improved radiating fin, a thermal module using the same, and a method of manufacturing the same.

SUMMARY OF THE INVENTION

A primary object of the present invention is to provide a radiating fin having a main body and an extension provided around a through hole formed on the main body. The extension can be crimped to form a plurality of circumferentially alternate ridge portions and valley portions to press against and interfere with an outer surface of a heat pipe extended through the through hole, so that the main body can be firmly bound to the heat pipe.

Another object of the present invention is to provide a thermal module formed of a plurality of radiating fins and at least one heat pipe. Each of the radiating fins has a main body and an extension provided around a through hole formed on the main body, and the extension can be crimped to form a plurality of circumferentially alternate ridge portions and valley portions to press against and interfere with an outer surface of the heat pipe extended through the through hole. Therefore, all the radiating fins can be firmly bound to the at least one heat pipe to form the thermal module.

A further object of the present invention is to provide a method of manufacturing a radiating fin having a main body and an extension provided around a through hole formed on the main body. In the manufacturing method, the extension is crimped to form a plurality of circumferentially alternate ridge portions and valley portions to press against and interfere with an outer surface of a heat pipe extended through the through hole, so that the radiating fin can be firmly bound to the heat pipe.

To achieve the above and other objects, the radiating fin according to the present invention includes a main body having a first side and an opposite second side, and being provided with at least one through hole to extend between the first and the second side for a heat pipe to extend therethrough; and at least one extension being formed on at least one of the first and the second side of the main body to locate around the at least one through hole and axially project from the main body. The extension can be crimped to form a plurality of circumferentially alternate ridge portions and valley portions for tightly pressing against an outer surface of the heat pipe extended through the through hole, so as to firmly bind the radiating fin to the heat pipe.

Each of the ridge portions is directly adjacent to one valley portion at each of two opposite sides of the ridge portion; and the ridge portions and the valley portions interfere with the outer surface of the heat pipe. The ridge portions can respectively have a width larger than, equal to, or smaller than the width of the valley portions.

To achieve the above and other objects, the method of manufacturing a radiating fin according to the present invention includes the following steps: forming at least one through hole on a main body; forming an extension around the at least one through hole, such that the extension axially projects from the main body; extending a heat pipe through the through hole, so that the extension is located around an outer surface of the heat pipe; providing a crimping device having a plurality of plates, each of which has at least one notch internally provided with a plurality of teeth spaced from one another by a spacing; externally positioning the plates on at least two opposite sides of the extension; and moving the plates toward the extension to apply a crimping force on the extension, so that the extension is compressed and crimped to form a plurality of circumferentially alternate ridge portions and valley portions corresponding to the spacing and the teeth, respectively, in the notches for tightly pressing against and binding to the outer surface of the heat pipe.

In a preferred embodiment of the present invention, the crimping device includes a first and a second plate. The first plate has at least one substantially semicircular first notch, and the second plate has at least one substantially semicircular second notch. The ridge portions are formed corresponding to the spacing while the valley portions are formed corresponding to the teeth.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention provides a radiating fin, a thermal module using such radiating fin, and a method of manufacturing such radiating fin; and will now be described with some preferred embodiments thereof as illustrated in the accompanying drawings. Please refer to FIGS. 1, 2 and 3, in which a radiating fin according to the present invention is shown. As shown, the radiating fin includes a main body 11, on which at least one through hole 114 is provided for at least one heat pipe 12 to extend therethrough and fit therein; and at least an extension 115 located around the at least one through hole 114 to axially project from the main body 11.

Figure 1:
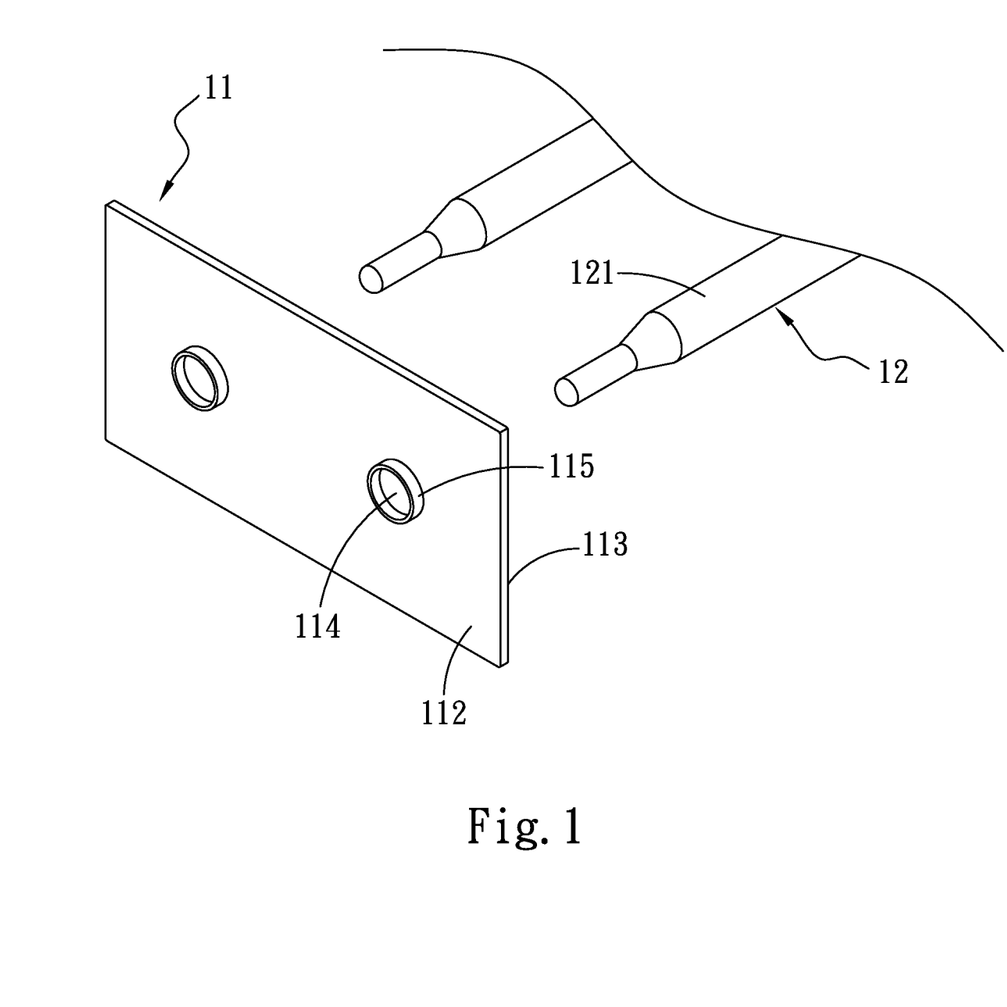
FIG. 1 is an exploded perspective view showing a radiating fin of the present invention and heat pipes for assembling to a main body of the radiating fin.

As can be seen in FIG. 1, the main body 11 has a first side 112 and an opposite second side 113. The through hole 114 penetrates the main body 1 to extend between the first side 112 and the second side 113. In the illustrated preferred embodiment, two through holes 114 are provided without being limited thereto. That is, more than one through hole 114 can be formed on the main body 11.

The extension 115 is provided around each of the through holes 114, and can be projected from the first side 112 or the second side 113 of the main body 10. In the illustrated preferred embodiment, the extensions 115 are projected from the first side 112 of the main body 1.

Figure 2:
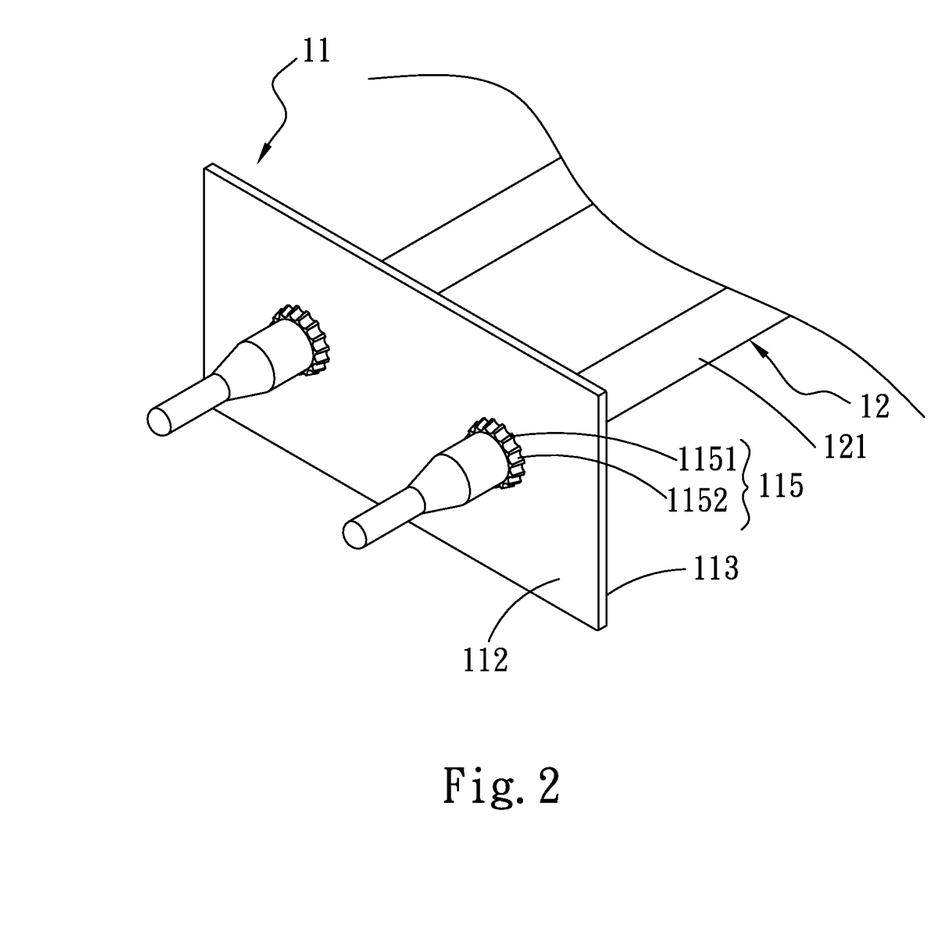
FIG. 2 is an assembled view of FIG. 1.
Figure 3:
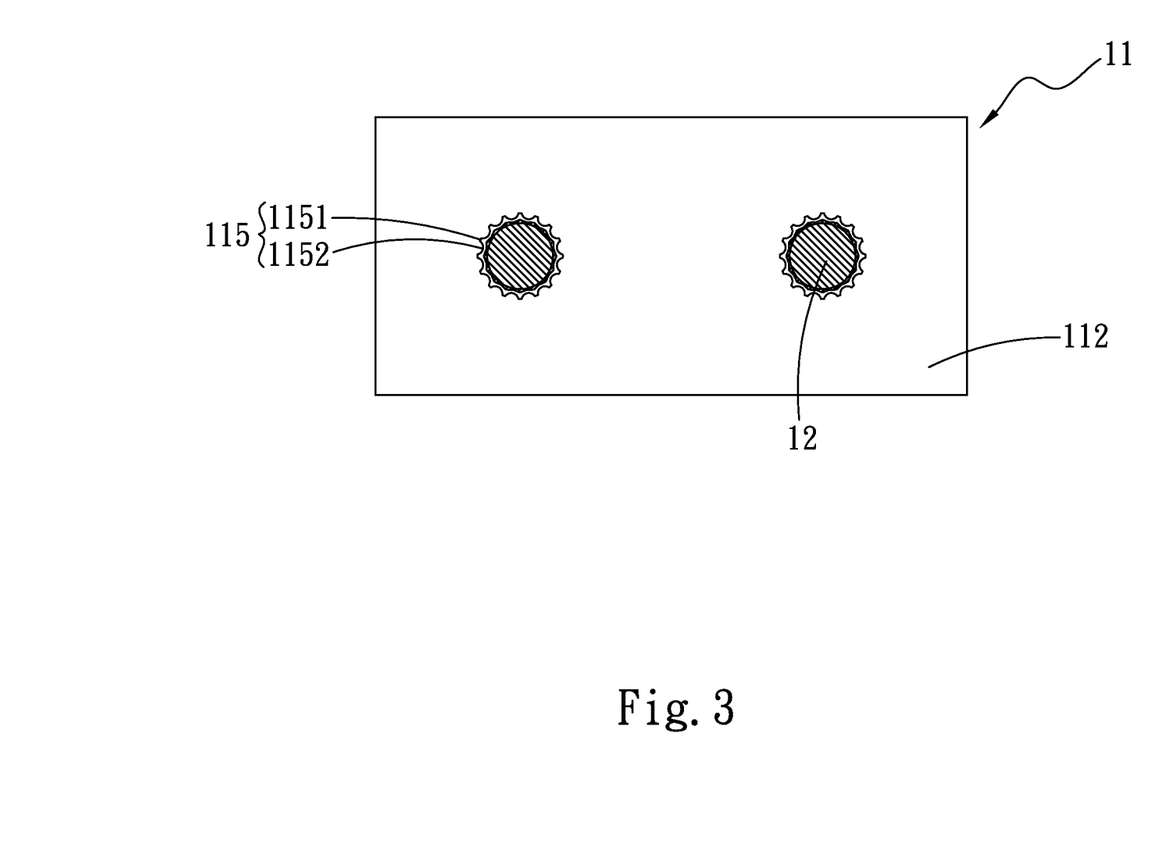
FIG. 3 is a front view of FIG. 2.

As can be seen in FIGS. 1, 2 and 3, each of the through holes 114 can have one heat pipe 12 extended therethrough and fitted therein. The heat pipes 12 are separately extended through the through holes 114, as shown in FIG. 1, so that the main body 11 is associated with and supported on the heat pipes 12 with the extensions 115 correspondingly located around outer surfaces 121 of the heat pipes 12, as shown in FIGS. 2 and 3. The extensions 115 are then separately crimped, such that each of the extensions 115 is formed into a plurality of circumferentially alternate ridge portions 1151 and valley portions 1152. Each of the ridge portions 1151 is directly adjacent to one valley portion 1152 at each of two opposite sides of the ridge portion 1151. The ridge and valley portions 1151, 1152 formed on the crimped extensions 115 are able to tightly press against and accordingly interfere with the outer surfaces of the heat pipes 12, bringing the heat pipes 12 to firmly associate with the main body 11 of the radiating fin.

Figure 4:
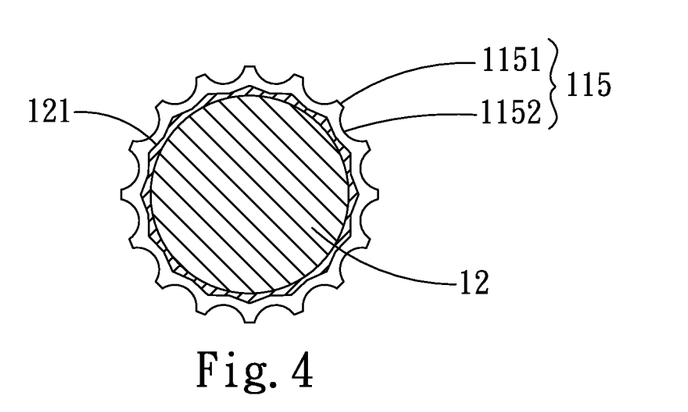
FIG. 4 is a sectional view showing an extension of the radiating fin of the present invention in a first crimped manner.
Figure 5:
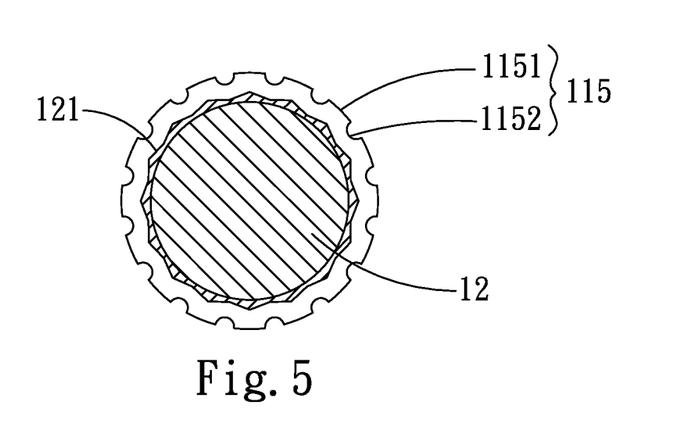
FIG. 5 is a sectional view showing the extension of the radiating fin of the present invention in a second crimped manner.
Figure 6:
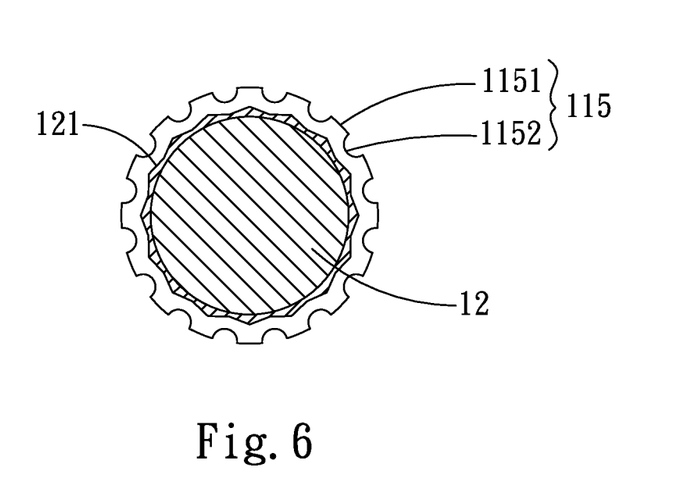
FIG. 6 is a sectional view showing the extension of the radiating fin of the present invention in a third crimped manner.

FIGS. 4, 5 and 6 illustrate the extension 115 crimped in different manners. In FIG. 4, the ridge portions 1151 each have a width smaller than that of the valley portions 1152. In FIG. 5, the ridge portions 1151 each have a width larger than that of the valley portions 1152. In FIG. 6, the ridge portions 1151 each have a width equal to that of the valley portions 1152.

Figure 7:
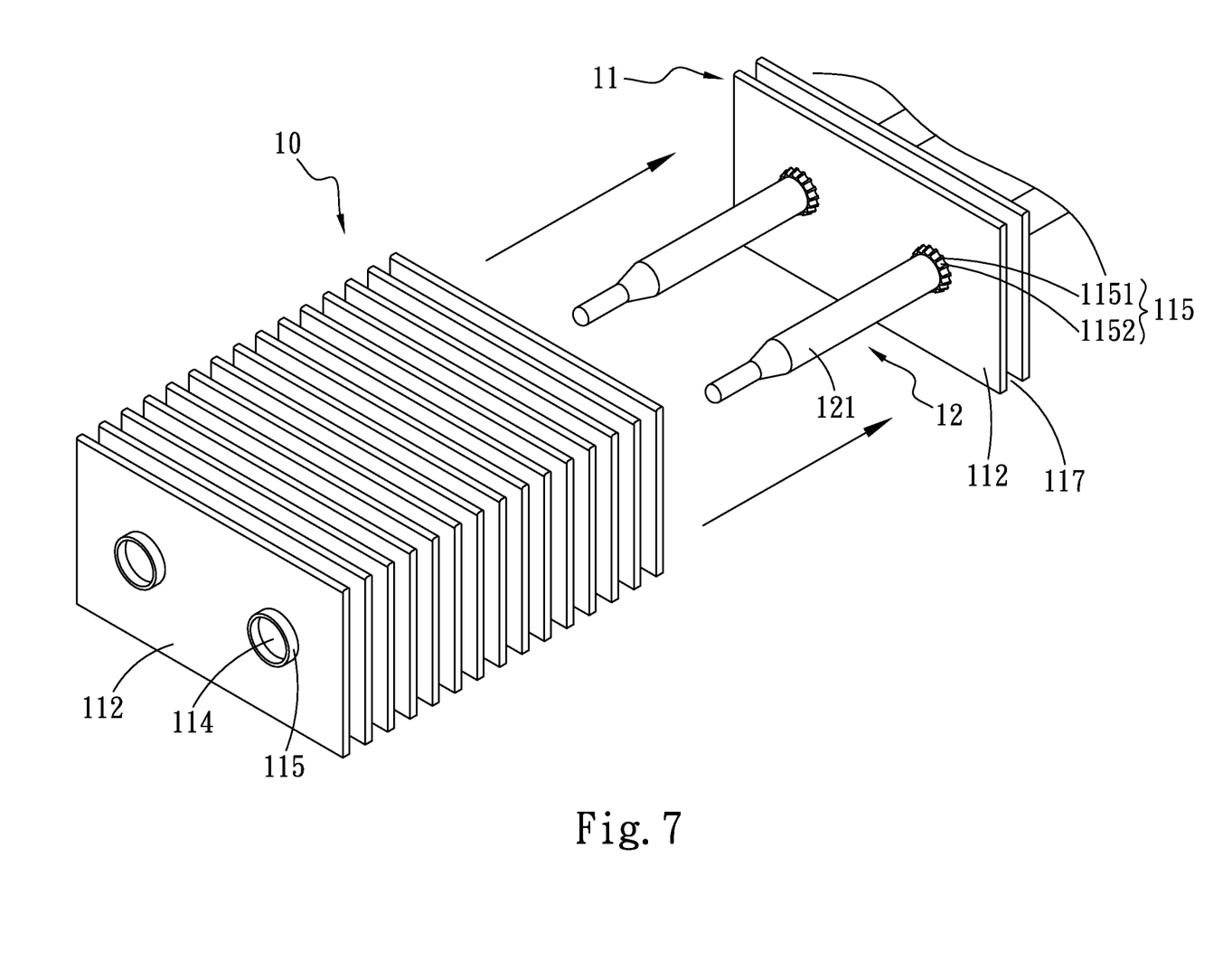
FIG. 7 is an exploded perspective view of a thermal module according to the present invention.
Figure 8:
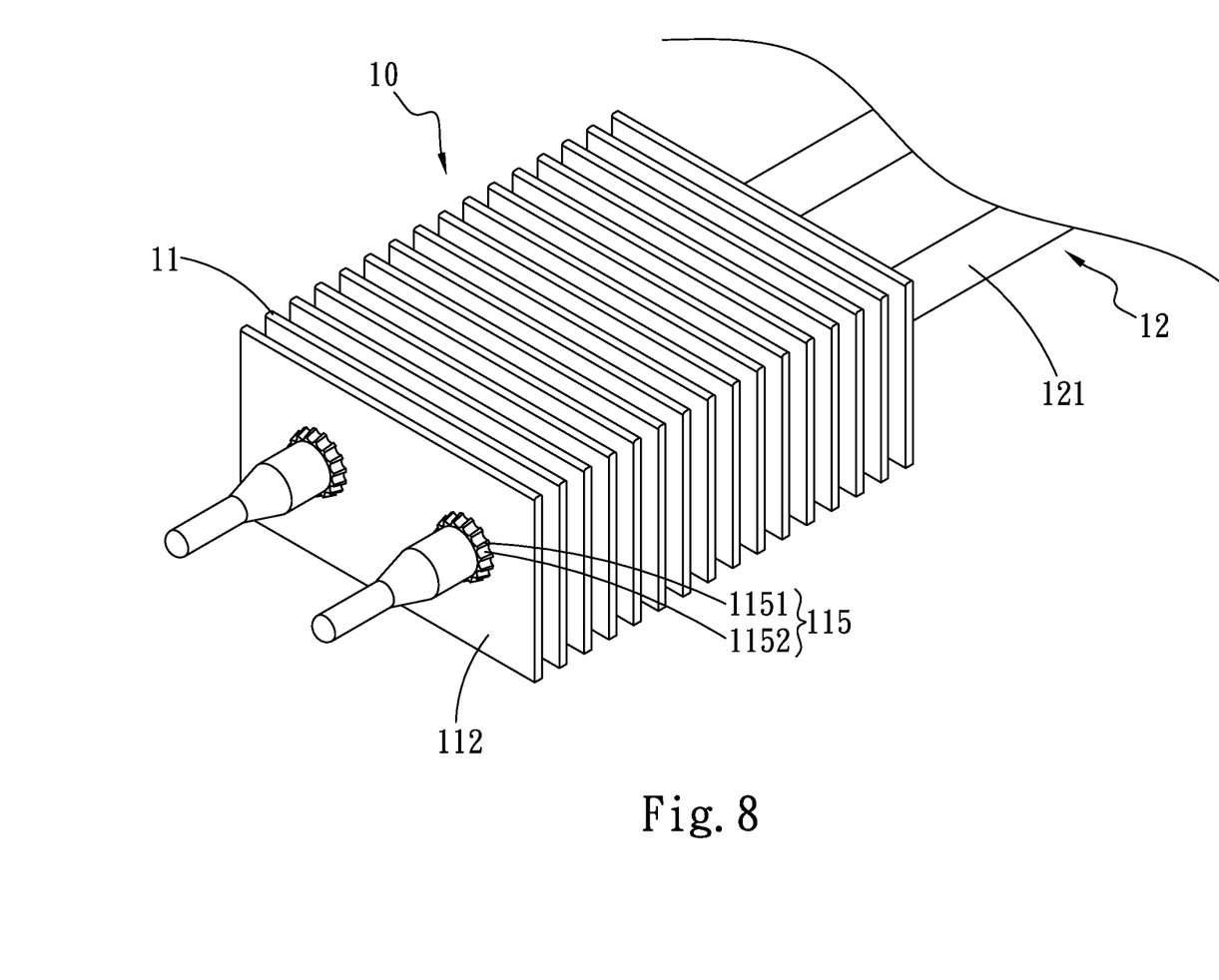
FIG. 8 is an assembled view of FIG. 7.

Please refer to FIGS. 7 and 8 that are exploded and assembled perspective views, respectively, of a thermal module 10 formed by sequentially assembling a plurality of the above-described radiating fins of the present invention to the heat pipes 12. The main bodies 11 of these radiating fins are identically provided with the through holes 114, and are spaced from one another to form a flow passage 117 between any two adjacent main bodies 11. The extensions 115 on each individual main body 11 are crimped to form the above-mentioned ridge portions 1151 and valley portions 1152 after the main body 11 has been fitted on the heat pipes 12. The ridge portions 1151 and the valley portions 1152 are tightly pressed against the outer surfaces 121 of the heat pipes 12 to interfere therewith, so that the main bodies 11 and the heat pipes 12 are firmly connected to one another, giving the whole thermal module 10 a solid structure. That is, the main bodies 11 of the radiating fins would not move or shake relative to the heat pipes 12.

Figure 9:
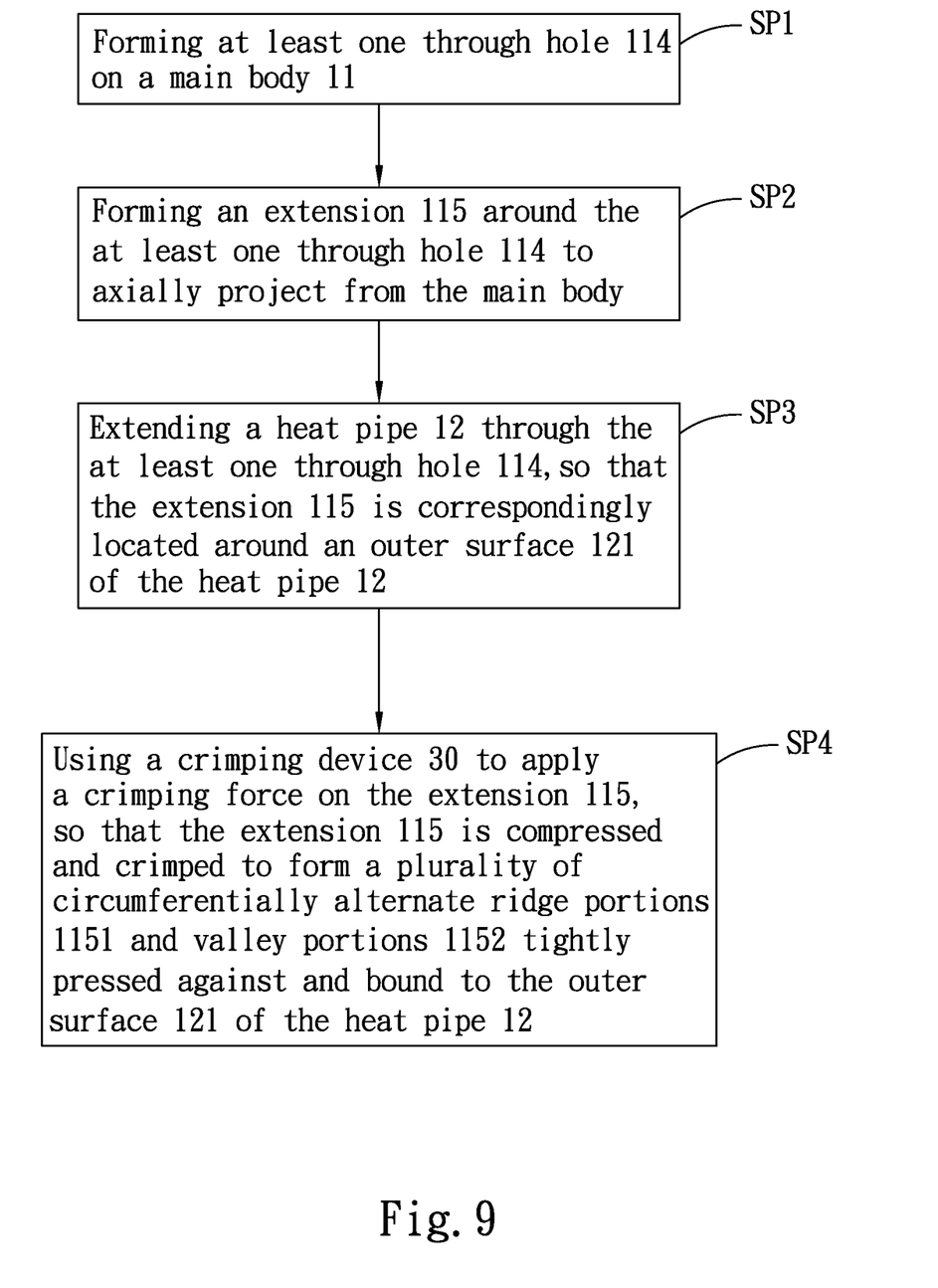
FIG. 9 is a flowchart showing the steps included in a method of manufacturing the radiating fin of the present invention.
Figure 10:
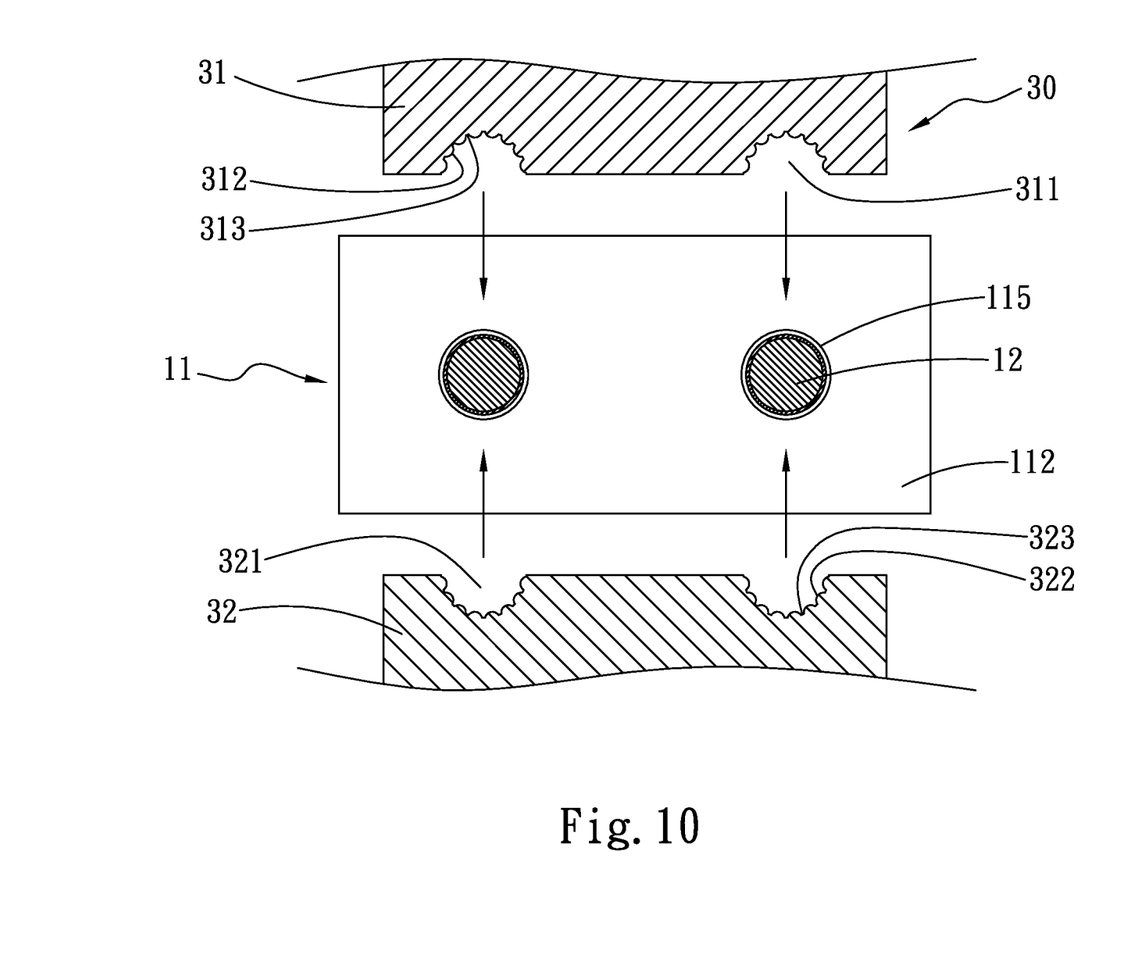
FIG. 10 is a schematic view showing a crimping device before being closed to crimp the extensions of the radiating fin of the present invention.
Figure 11:
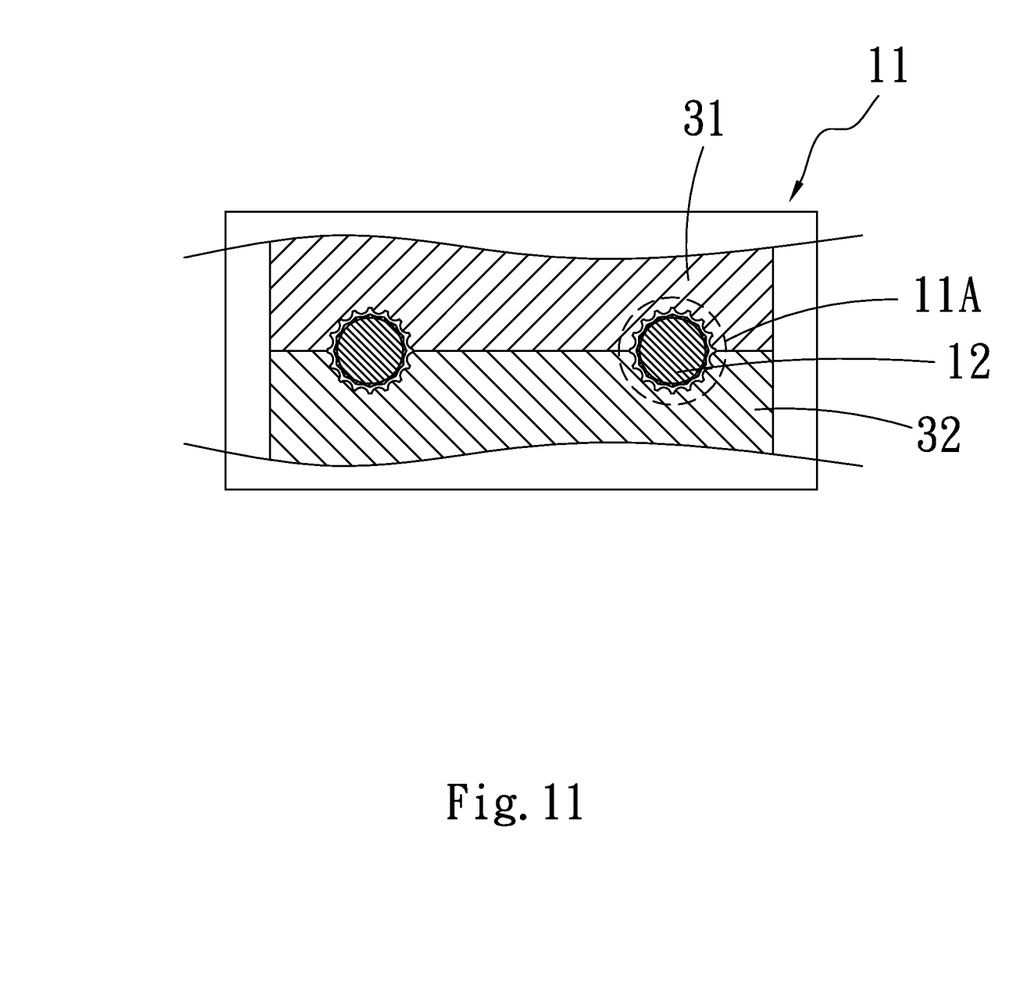
FIG. 11 shows the crimping device of FIG. 10 having been closed to crimp the extensions of the radiating fin of the present invention.

FIG. 9 is a flowchart showing the steps included in a method of manufacturing the radiating fin of the present invention. Please refer to FIG. 9 along with FIGS. 1 and 2. The method of manufacturing the radiating fin according to the present invention includes the following steps:

Step 1 (SP1): forming at least one through hole 114 on a main body 11, as shown in FIG. 1;

Step 2 (SP2): forming an extension 115 around the at least one through hole 114, such that the extension 115 axially projects from the main body 11;

Step 3 (SP3): extending a heat pipe 12 through the through hole 114, so that the extension 115 is correspondingly located around an outer surface 121 of the heat pipe 12; and Step 4 (SP4): using a crimping device 30 to apply a crimping force on the extension 115, so that the extension 115 is compressed and crimped to form a plurality of circumferentially alternate ridge portions 1511 and valley portions 1512, which are tightly pressed against and bound to the outer surface of the heat pipe 12, as shown in FIGS. 10 and 11.

In the first and the second step (SP1), (SP2), the through hole 114 and the extension 115 are preferably formed on the main body 11 by general stamping.

Figure 11A:
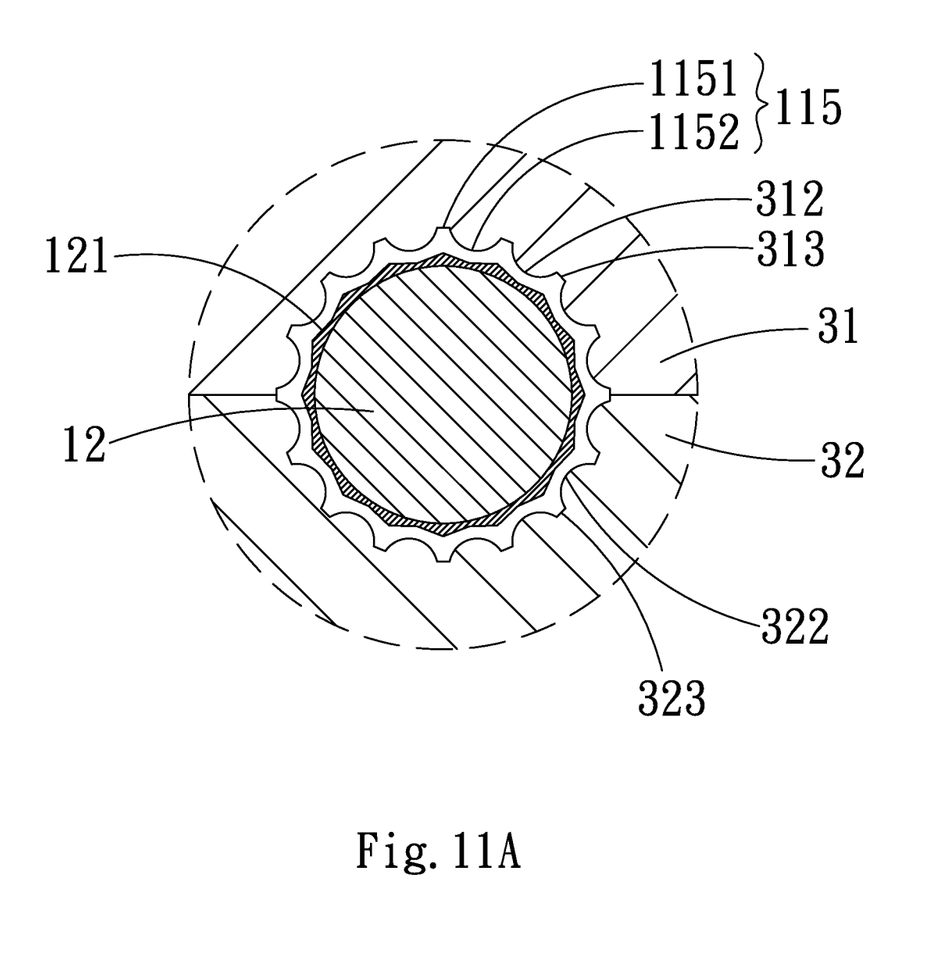
FIG. 11A is an enlarged view of the circled area 11A in FIG. 11.

Please refer to FIGS. 10, 11 and 11A. The crimping device 30 includes a first plate 31 having at least one substantially semicircular first notch 311 with a plurality of first teeth 312 formed along the semicircular edge thereof and spaced from one another by a first spacing 313, and a second plate 32 having at least one substantially semicircular second notch 321 with a plurality of second teeth 322 formed along the semicircular edge thereof and spaced from one another by a second spacing 323.

To crimp the extension 115, the first plate 31 and the second plate 32 are separately externally positioned on at least two opposite sides of the extension 115. Then, move the first and the second plate 31, 32 toward the extension 115 to thereby close the first and the second plate 31, 32 to each other. At this point, the first notch 311 and the second notch 321 together apply a force on an outer surface of the extension 115, so that the ridge portions 1151 and the valley portions 1152 are formed on and around the extension 115.

As can be seen in FIG. 11A, the ridge portions 1151 are formed corresponding to the first and the second spacing 313, 323, and the valley portions 1152 are formed corresponding to the first and the second teeth 312, 322. Through the above steps SP1-SP4, all the extensions 115 become interfering with the outer surface 121 of the heat pipe 12 to tightly bind the main bodies 11 of the radiating fins to the heat pipe 12.

The radiating fin, the thermal module formed using the same, and the method of manufacturing the same according to the present invention are improved in the following aspects compared to the prior art:

(1) A plurality of ridge portions 1151 and valley portions 1152 are formed on and around the extension 115 of the radiating fin to interfere with the outer surface 121 of the heat pipe 12, so as to tightly bind the main body 11 of the radiating fin to the outer surface 121 of the heat pipe 12.

(2) A plurality of ridge portions 1151 and valley portions 1152 are formed on and around the extensions 115 of each of a plurality of the radiating fins to interfere with the outer surfaces 121 of the heat pipes 12, so as to tightly bind the main bodies 11 of the radiating fins to the heat pipes 12, enabling the forming of a thermal module 10 with a solid overall structure.

(3) In the radiating fin manufacturing method, when the heat pipe 12 is extended through the main body 11 of the radiating fin, the extension 115 formed on the main body 11 is crimped to form a plurality of ridge portions 1151 and valley portions 1152, such that the ridge and the valley portions 1151, 1152 interfere with the outer surface 121 of the heat pipe 12, enabling the main body 11 and the heat pipe 12 to firmly connect to each other.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A radiating fin, comprising:
   a main body having a first side and an opposite second side, and being provided with at least one through hole; the through hole penetrating the main body to extend between the first and the second side for a heat pipe to extend therethrough; and
   at least one extension being formed as a continuous cylindrical ring on at least one of the first and the second side of the main body to locate around the at least one through hole and axially project from the main body;
   wherein the extension has a crimped surface that includes undulating and repeating configurations, the configurations including alternate ridge portions and flute portions extending in a radial direction around the surface of the extension pressing against and thereby deforming an outer surface of the heat pipe in an undulating pattern;
   wherein the ridge portions and the flute portions interfere physically with the outer surface of the heat pipe and tightly bind to the outer surface of the heat pipe; and
   wherein an area of the surface of the extension touching the environmental air is increased.

2. The radiating fin as claimed in claim 1, wherein each of the ridge portions is directly adjacent to one flute portion at each of two opposite sides of the ridge portion.

3. The radiating fin as claimed in claim 1, wherein the ridge portions each have a width larger than that of the flute portions.

4. The radiating fin as claimed in claim 1, wherein the ridge portions each have a width smaller than that of the flute portions.

5. The radiating fin as claimed in claim 1, wherein the ridge portions each have a width equal to that of the flute portions.

6. A thermal module, comprising:
   at least one heat pipe; and
   a plurality of radiating fins; each of the radiating fins including:
   a main body having a first side and an opposite second side, and being provided with at least one through hole penetrating the main body to extend between the first and the second side for the heat pipe to extend therethrough, and
   at least one extension being formed as a continuous cylindrical ring on at least one of the first and the second side of the main body to locate around the at least one through hole and axially project from the main body;
   wherein the extension has a crimped surface that includes undulating and repeating continuity configurations, the configurations including alternate ridge portions and flute portions extending in a radial direction around the surface of the extension pressing against and thereby deforming an outer surface of the heat pipe in an undulating pattern;
   wherein the ridge portions and the flute portions interfere physically with the outer surface of the heat pipe and tightly bind to the outer surface of the heat pipe; and
   wherein an area of the surface of the extension touching the environmental air is increased.

7. The thermal module as claimed in claim 6, wherein each of the ridge portions is directly adjacent to one flute portion at each of two opposite sides of the ridge portion.

8. The thermal module as claimed in claim 6, wherein the ridge portions each have a width larger than that of the flute portions.

9. The thermal module as claimed in claim 6, wherein the ridge portions each have a width smaller than that of the flute portions.

10. The thermal module as claimed in claim 6, wherein the ridge portions each have a width equal to that of the flute portions.

* * * * *